US007120837B1

(12) United States Patent
Ferris

(10) Patent No.: US 7,120,837 B1
(45) Date of Patent: Oct. 10, 2006

(54) SYSTEM AND METHOD FOR DELAYED ERROR HANDLING

(75) Inventor: Scott M. Ferris, Edina, MN (US)

(73) Assignee: Cisco Technology, Inc., San Jose, CA (US)

(*) Notice: Subject to any disclaimer, the term of this patent is extended or adjusted under 35 U.S.C. 154(b) by 430 days.

(21) Appl. No.: 10/143,560

(22) Filed: May 9, 2002

(51) Int. Cl.
    G06F 11/00 (2006.01)
(52) U.S. Cl. ............................ 714/56; 714/42
(58) Field of Classification Search ........ 714/4, 714/43, 56, 17
    See application file for complete search history.

(56) References Cited

U.S. PATENT DOCUMENTS

| 5,579,491 | A | * | 11/1996 | Jeffries et al. ........... 710/302 |
| 5,996,024 | A | * | 11/1999 | Blumenau ................. 719/326 |
| 5,996,027 | A | | 11/1999 | Volk et al. |
| 6,009,476 | A | | 12/1999 | Flory et al. |
| 6,209,023 | B1 | | 3/2001 | Dimitroff et al. |
| 6,470,382 | B1 | | 10/2002 | Wang et al. |
| 6,574,755 | B1 | * | 6/2003 | Seon ......................... 714/56 |
| 6,658,459 | B1 | | 12/2003 | Kwan et al. |
| 6,701,449 | B1 | * | 3/2004 | Davis et al. ................ 714/4 |
| 6,760,783 | B1 | | 7/2004 | Berry |
| 6,799,316 | B1 | | 9/2004 | Aguilar et al. |
| 6,823,418 | B1 | | 11/2004 | Langendorf et al. |
| 6,886,171 | B1 | | 4/2005 | MacLeod |
| 2002/0103943 | A1 | | 8/2002 | Lo et al. |
| 2002/0194428 | A1 | * | 12/2002 | Green ....................... 711/114 |
| 2003/0058870 | A1 | * | 3/2003 | Mizrachi et al. ........ 370/395.52 |
| 2003/0084209 | A1 | * | 5/2003 | Chadalapaka .............. 710/5 |
| 2003/0097607 | A1 | * | 5/2003 | Bessire ..................... 714/5 |
| 2003/0182455 | A1 | | 9/2003 | Hetzler et al. |
| 2004/0233910 | A1 | | 11/2004 | Chen et al. |

OTHER PUBLICATIONS

Satran et al. "iSCSI." IPS Internet Draft. Nov. 2000. retreived Aug. 11, 2005, from http://www.haifa.il.ibm.com/satran/ips.*

* cited by examiner

Primary Examiner—Robert Beausoliel
Assistant Examiner—Philip A. Guyton
(74) Attorney, Agent, or Firm—Schwegman, Lundberg Woessner & Kluth P.A.

(57) ABSTRACT

A system and method for delayed error handling. In one embodiment, a computerized method includes sending a Small Computer Systems Interface (SCSI) command to a peripheral device through a network connection, waiting for a SCSI response from the peripheral device, detecting an error in the network connection, waiting for an amount of time that is consistent with the network connection to the peripheral device being re-established, and determining if the error in the network connection has been corrected. In another embodiment, a computerized method includes detecting the iSCSI error on an IP network connection to an iSCSI peripheral device after an iSCSI command has timed out, waiting (upon detection) for an amount of time for the IP network connection to become re-established, checking (while waiting) to determine if the IP network connection has been re-established, and performing an iSCSI error-recovery function if the IP network connection has been re-established.

3 Claims, 7 Drawing Sheets

SYSTEM AND METHOD FOR DELAYED ERROR HANDLING

RELATED APPLICATIONS

This invention is related to application Ser. No. 10/143,456, filed May 9, 2002, entitled "SYSTEM, METHOD, AND SOFTWARE FOR A VIRTUAL HOST BUS ADAPTER IN A STORAGE AREA NETWORK"; application Ser. No. 10/128,656, filed Apr. 22, 2002, entitled "SCSI BASED STORAGE AREA NETWORK"; application Ser. No. 10/131,793, filed Apr. 22, 2002, entitled "VIRTUAL SCSI BUS FOR SCSI BASED STORAGE AREA NETWORK"; all of the above of which are hereby incorporated by reference.

FIELD OF THE INVENTION

The present invention relates to the field of data storage, and more particularly to the field of delayed error handling in a data storage system.

BACKGROUND OF THE INVENTION

Interest in the use of network-based storage systems has increased considerably in recent years. Storage servers connected to a network provide commonly available mass storage that can be shared or allocated exclusively to each of a number of computers or other information-handling systems connected to a common network.

The Small Computer Systems Interface (SCSI) is a widely used standard for accessing various storage devices such as hard discs, CD-ROM's, DVD's, ZIP discs, tapes, Superdisks, and the like. Newer versions and interface definitions have been developed, including wide, fast, wide and fast, 40 MB/s, 80 MB/s, 160 MB/s and fiber channel (both copper-wire and optical versions), and the like. These interfaces, however, are all storage-based architectures.

The Internet and many other communications networks use TCP/IP (including the software interface layers for telecommunications protocol and Internet Protocol) to transfer data. It generally takes a dedicated computer interface to receive and decode (or code and transmit) TCP/IP packets, and to pass data carried by such packets to applications residing at higher layers in the communications stack.

The Internet SCSI (iSCSI) protocol has been under consideration recently as a way of extending SCSI-based services across an IP network. Neither the iSCSI protocol nor the SCSI protocol itself define how to handle certain errors due to, for instance, the network connection between a computer and an iSCSI-based storage device going down. Currently, some systems will retry the iSCSI command repeatedly, and eventually take the peripheral device offline if the retries fail.

Therefore, there is a need for an error-handling system and method that address error handling due to network problems in an iSCSI-based system.

SUMMARY OF THE INVENTION

In one embodiment, a computerized method includes sending a Small Computer Systems Interface (SCSI) command to a peripheral device through a network connection, waiting for a SCSI response from the peripheral device, detecting an error in the network connection, waiting for an amount of time that is consistent with the network connection to the peripheral device being re-established, and determining if the error in the network connection has been corrected.

In another embodiment, a computerized method for handling an iSCSI error includes detecting the iSCSI error on an IP network connection to an iSCSI peripheral device after an iSCSI command has timed out, waiting (upon detection) for an amount of time for the IP network connection to become re-established, checking (while waiting) to determine if the IP network connection has been re-established, and performing an iSCSI error-recovery function if the IP network connection has been re-established.

In another embodiment, a method for handling a SCSI error includes detecting a SCSI error on a network connection to a peripheral device, invoking (upon detection) a first error handler that checks the network connection, waits for a first amount of time that is consistent with the network connection being re-established, and controls a first error-handling function, and determining at a first point in time if the SCSI error has been corrected.

In another embodiment, a data-processing system includes a processor, a memory, and data-processing software. The data-processing software is operable on the data-processing system to transmit a SCSI request to a peripheral device through an IP connection, wait for a SCSI response from the peripheral device, detect an error condition in the IP connection, wait for a specified period of time that is consistent with the IP connection being re-established, and determine if the error condition in the IP connection has been corrected.

DETAILED DESCRIPTION

A novel system and method for delayed error handling is described herein. In the following detailed description of the embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following description is, therefore, not to be taken in a limiting sense.

Figure 1:
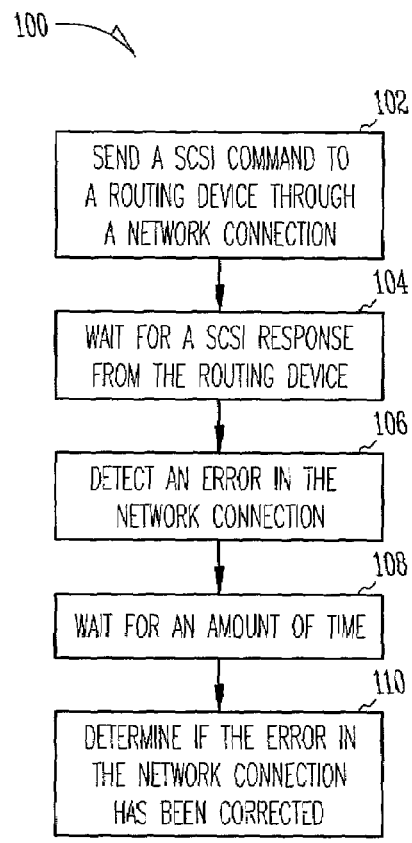
FIG. 1 is a flow diagram illustrating a method for implementing error handling, according to one embodiment of the present invention.

FIG. 1 is a flow diagram illustrating a method for implementing error handling, according to one embodiment of the present invention. In this embodiment, computerized method 100 includes blocks 102, 104, 106, 108, and 110. Block 102 includes sending a Small Computer Systems Interface (SCSI) command to a peripheral device through a network connection. Block 104 includes waiting for a SCSI response from the peripheral device. Block 106 includes detecting an error in the network connection. Block 108 includes waiting for an amount of time that is consistent with the network connection to the peripheral device being re-established. If the network connection has become re-established, then method 100 no longer needs to continue waiting. Otherwise, method 100 waits for the full amount of time. Block 110 includes determining if the error in the network connection has been corrected.

In one embodiment, the sending of the SCSI command in block 102 includes sending the SCSI command to the peripheral device through an IP connection.

In another embodiment, the sending of the SCSI command in block 102 includes sending an Internet SCSI (iSCSI) command to the peripheral device through the network connection. The sending of the iSCSI command includes sending the iSCSI command using an iSCSI miniport driver implemented in a communication stack. The iSCSI protocol is a mapping of the SCSI remote procedure invocation model over the TCP protocol. SCSI commands are carried by iSCSI requests and SCSI responses, and status are carried by iSCSI responses. iSCSI also uses the request response mechanism for iSCSI protocol mechanisms.

In another embodiment, the waiting for the SCSI response in block 104 includes waiting for a predetermined period of time.

In another embodiment, the detecting of the error in block 106 includes detecting a timeout after waiting for the SCSI response.

In various embodiments and implementations, there are a number of potential reasons as to why an error occurs on the network connection. There may be a high amount of network congestion, or high susceptibility to network failures. The peripheral device may experience temporary or long-term problems, or may need to reboot to handle certain forms of errors. Network problems (such as intermediate cables or hardware devices) may cause communication failure. Networks that include GbE interfaces may require longer negotiation phases (e.g., on the order of thirty to sixty seconds) to bring back up a port, or connection, after it is dropped. In these situational embodiments, block 106 includes detecting the error in the network connection using a timer or other similar detection mechanism.

In another embodiment, the detecting of the error in block 106 includes detecting the error in the network connection by an iSCSI miniport driver implemented in a communication stack.

In another embodiment, the waiting for an amount of time in block 108 includes waiting for an amount of time that is greater than a reboot time of the peripheral device. In one implementation, the reboot time includes time to reboot while running diagnostics.

In another embodiment, method 100 further comprises fully processing the SCSI response from the peripheral device if the error in the network connection has been corrected.

In another embodiment, method 100 further comprises establishing a new network connection to the peripheral device if the error has not been corrected, and sending the SCSI command to the peripheral device over the new network connection.

For certain embodiments that are implemented on the Linux operating system, an iSCSI error handler manages detecting network connection failures, and waiting for network connections to become re-established. If a network connection is still down after a wait timeout, then the error handler returns failure. If the network connection comes back up, the error handler performs error recovery operations, and returns success. For other embodiments that are implemented on a Solaris operating system, an iSCSI driver checks for iSCSI command timeouts (for commands that were sent to a remote peripheral device). In some implementations, the iSCSI driver also can perform error recovery.

In another embodiment, a computerized method for handling an iSCSI error includes detecting the iSCSI error on an IP network connection to an iSCSI peripheral device after an iSCSI command has timed out, waiting (upon detection) for an amount of time for the IP network connection to become re-established, checking (while waiting) to determine if the IP network connection has been re-established, and performing an iSCSI error-recovery function if the IP network connection has been re-established. In one implementation, the performing of the iSCSI error-recovery function includes aborting the iSCSI command. In another implementation, the performing of the iSCSI error-recovery function includes initiating a reset for a local bus or HBA.

In another embodiment, a computer-readable medium having computer-executable instructions stored thereon performs the methods of the embodiments described above. In one embodiment, the computer-readable medium includes a storage device (e.g., a floppy or hard-disk storage device) that contains a software driver executable on a host computer. In another embodiment, the computer-readable medium includes a firmware (or microcode) driver implemented on a host system. In another embodiment, the computer-readable medium includes a computer data signal embodied in a carrier wave that represents a sequence of computer-executable instructions. In yet another embodiment, the computer-readable medium includes a propagated signal carrying computer-readable information representing a computer program. In certain embodiments, a computer data signal is propagated over a network connection, such as an IP network connection.

Figure 2A:
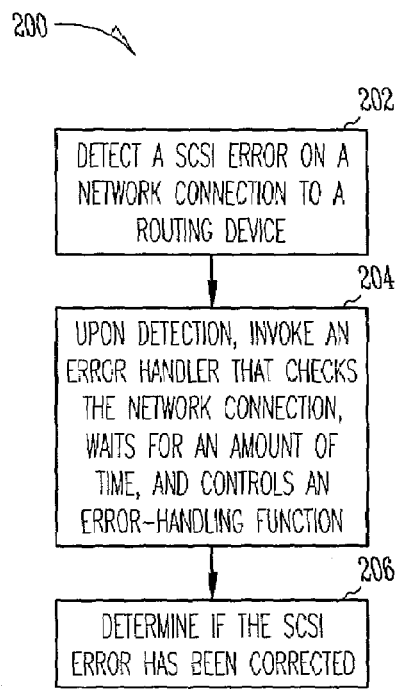
FIG. 2A is a flow diagram illustrating a method for utilizing an error handler, according to one embodiment of the present invention.

FIG. 2A is a flow diagram illustrating a method for utilizing an error handler, according to one embodiment of the present invention. In this embodiment, method 200 includes blocks 202, 204, and 206. Block 202 includes detecting the SCSI error on a network connection to a peripheral device. Block 204 includes invoking (upon detection) a first error handler that checks the network connection, waits for a first amount of time that is consistent with the network connection being re-established, and controls a first error-handling function. Block 206 includes determining at a first point in time if the SCSI error has been corrected.

In one embodiment, the detecting of the SCSI error in block 202 includes detecting a timeout after waiting for SCSI data.

In another embodiment, the detecting of the SCSI error in block 202 includes detecting an iSCSI error on a network connection.

In another embodiment, the detecting of the SCSI error in block 202 includes detecting the SCSI error on a Transmission Control Protocol (TCP) network connection.

In another embodiment, the invoking of the first error handler in block 204 includes invoking the first error handler that waits for a first amount of time greater than a reboot time of the peripheral device. By waiting as such, the first error handler allows sufficient time for the peripheral device to reboot and re-establish one or more connections, and resume communication. In one implementation, the reboot time of the peripheral device includes time to reboot while running diagnostics.

In another embodiment, the invoking of the first error handler in block 204 includes invoking a SCSI command abort error handler. In one implementation, the SCSI command abort error handler attempts to wait for the network connection to become corrected (or re-established). In another implementation, the SCSI command abort error handler attempts to obtain diagnostic data concerning the network connection.

In another embodiment, the invoking of the first error handler in block 204 includes invoking a peripheral device reset error handler. In one implementation, the peripheral device reset error handler attempts to wait for the network connection to become corrected (or re-established). In another implementation, the peripheral device reset error handler attempts to obtain diagnostic data concerning the network connection.

In another embodiment, the invoking of the first error handler in block 204 includes invoking a bus reset error handler. In one implementation, the bus reset error handler attempts to wait for the network connection to become corrected (or re-established). In another implementation, the bus reset error handler attempts to obtain diagnostic data concerning the network connection.

In another embodiment, the invoking of the first error handler in block 204 includes invoking a local Host Bus Adaptor (HBA) reset error handler. In one implementation, the local HBA reset error handler attempts to wait for the network connection to become corrected (or re-established). In another implementation, the local HBA reset error handler attempts to obtain diagnostic data concerning the network connection.

In another embodiment, method 200 further comprises establishing a new network connection to the peripheral device if the SCSI error has not been corrected, and sending the SCSI command to the peripheral device over the new network connection.

In another embodiment, method 200 further comprises invoking a second error handler that checks the network connection, waits for a second amount of time that is consistent with the network connection being re-established, and controls a second error-handling function, and determining at a second point in time if the SCSI error has been corrected.

In another embodiment, a computer-readable medium having computer-executable instructions stored thereon performs the methods of the embodiments described above. In one embodiment, the computer-readable medium includes a storage device (e.g., a floppy or hard-disk storage device) that contains a software driver executable on a host computer. In another embodiment, the computer-readable medium includes a firmware (or microcode) driver implemented on a host system. In another embodiment, the computer-readable medium includes a computer data signal embodied in a carrier wave that represents a sequence of computer-executable instructions. In yet another embodiment, the computer-readable medium includes a propagated signal carrying computer-readable information representing a computer program. In certain embodiments, a computer data signal is propagated over a network connection, such as an IP network connection.

Figure 2B:
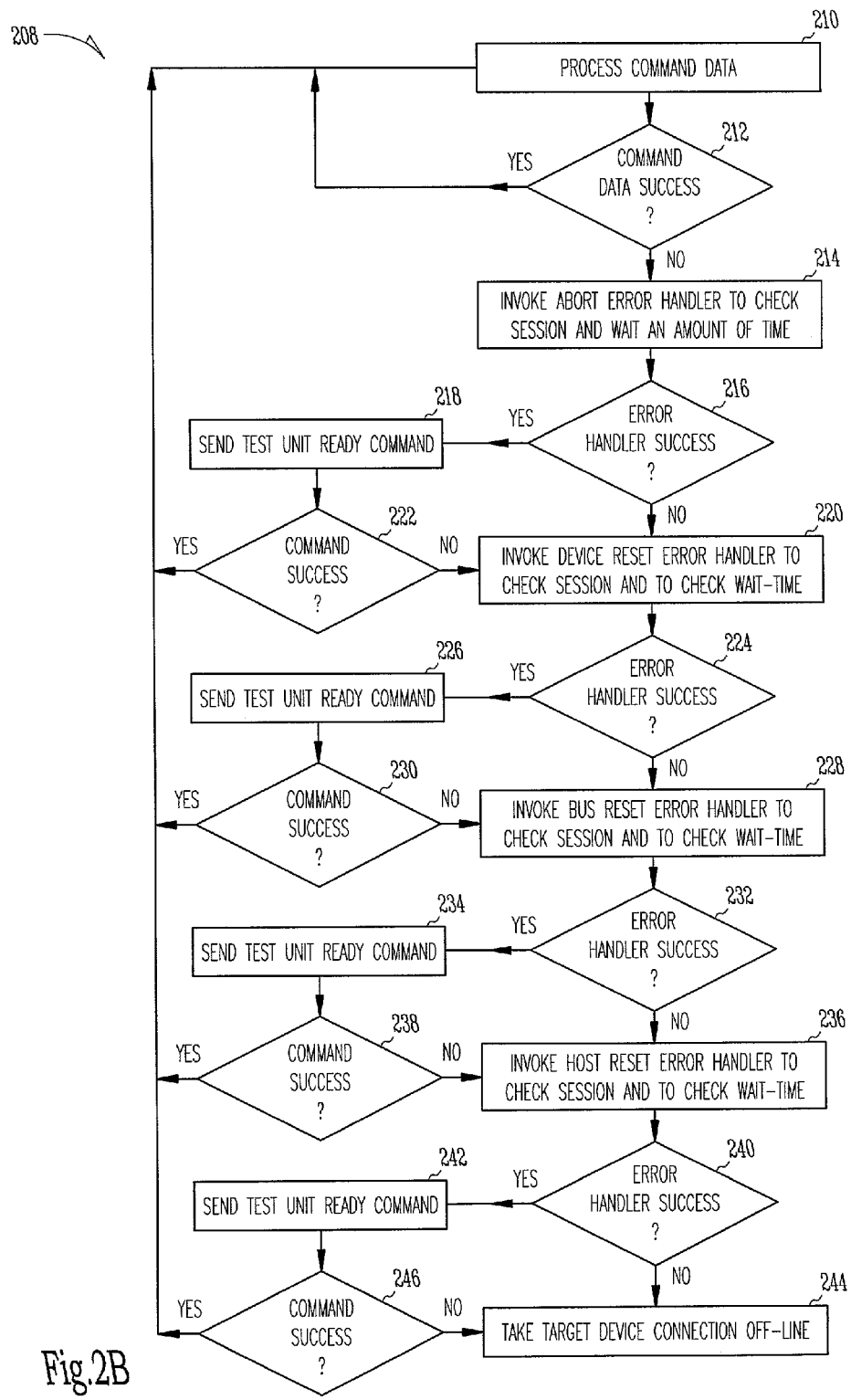
FIG. 2B is a flow diagram illustrating a method for utilizing a series of error handlers, according to another embodiment of the present invention.

FIG. 2B is a flow diagram illustrating a method for utilizing a series of error handlers, according to another embodiment of the present invention. In this embodiment, method 208 includes a number of blocks and checkpoints. In one embodiment, method 208 is implemented on the Linux operating system. Linux includes a dedicated thread for each SCSI driver handling error recovery. Block 210 includes processing command data on a host system. During processing, commands are sent to a remote target device. In one embodiment, the host system and the remote target device are coupled via an Internet network, wherein the remote target device includes an iSCSI interface, a SCSI peripheral device, and a SCSI interface, and wherein the remote target device is coupled to a Storage Area Network (SAN). Checkpoint 212 includes determining if the processing of the command data was successful. In one embodiment, checkpoint 212 includes checking a command timeout, to determine if the host system has received a response to the command data before a thirty-second timer expires. If the processing was successful, processing continues in block 210. If the processing was unsuccessful, method 208 continues with block 214. In one embodiment, method 208 records (or registers) the time when the session for processing data terminated. Block 214 includes invoking an abort error handler. In one embodiment, the abort error handler aborts the pending command. In another embodiment, the abort error handler checks the status of the session on which the command data had been processed. If the session is once again functional, then the error handler returns success. If the session is still non-functional (or down), then the error handler waits for an amount of time. The amount of time to wait is a configurable parameter. In one embodiment, the error handler waits for an amount of time (e.g., six minutes) that is greater than a reboot time (e.g., five minutes) of the remote target device. In this embodiment, the error handler allows sufficient time for the remote target device to reboot and re-establish communication, if the nature of the earlier error had required a remote target device reboot. While the error handler waits, it checks to determine if the session has been re-established. In one implementation, the error handler pings the session to determine status. If the session has been re-established, then the error handler terminates its waiting process, and returns success. If the error handler waits the full amount of time without detecting than the session has become re-established, then the error handler returns failure.

Checkpoint 216 determines if the abort error handler returned successfully. If not, method 208 continues with block 220 to invoke a device reset error handler. If the abort error handler returned successfully, block 218 sends a "test unit ready" command, to check the status of the remote target device. If the device is ready, then the "test unit ready" command returns success (or boolean TRUE). If the device is not ready, then the "test unit ready" command return failure (or boolean FALSE). In one implementation, the "test unit ready" command will only return success if it is able to verify that the device is ready within ten seconds. Checkpoint 222 determines if the "test unit ready" command succeeded. If so, then processing continues with block 210. If not, then method 208 continues with block 220.

In block 220, the device reset error handler functions to handle the error. In one embodiment, the error handler resets the device. In another embodiment, the error handler checks the status of the session on which the command data had been processed. If the session is once again functional, then the error handler returns success. If the session is still non-functional (or down), then the error handler checks the wait-time (i.e., the amount of time that has elapsed since the session went down). In some instances, a session may re-establish and terminate one or more times during the course of error handling. In these instances, a prior error handler may have already waited a certain period of time before the session became re-established. The device reset error handler needs to determine if the total wait-time (which can be configurable) has been met or exceeded. If it has, then the error handler returns failure. If it has not, then the error handler can wait for an additional amount of time, which may be greater than the required boot-time for the remote target device. While the error handler waits, it checks to determine if the session has been re-established. If the session has been re-established, then the error handler terminates its waiting process, and returns success. If the error handler waits the full additional amount of time without detecting than the session has become re-established, then the error handler returns failure.

Checkpoint 224 determines if the device reset error handler returned successfully. If not, method 208 continues with block 228 to invoke a bus reset error handler. If the device reset error handler returned successfully, block 226 sends a "test unit ready" command, to check the status of the remote target device. Checkpoint 230 determines if the "test unit ready" command succeeded. If so, then processing continues with block 210. If not, then method 208 continues with block 228.

Method 208 flows in a similar fashion (as shown in blocks 228, 234, 236, 242, and in checkpoints 232 and 238 of FIG. 2B) through invocation of the bus reset error handler in block 228, and through invocation of the host (i.e., HBA) reset error handler in block 236. The bus reset error handler, in one implementation, includes bus reset functionality, and the host reset error handler, in one implementation, includes HBA reset functionality. These error handlers also include, in certain embodiments, functionality for checking session status, and checking wait-time.

If all of the error handlers fail to handle the error (i.e., checkpoint 240 detects failure), or if the "test unit ready" command fails in checkpoint 246, method 208 continues to block 244. Block 244 includes taking the remote target device connection off-line.

In another embodiment, method 208 shown in FIG. 2B handles processing of many commands that are processed in the system. Method 208 provides error handling functionality for all commands that have failed, or timed out. For example, if sixty different commands timeout at the same time (which is common for a connection failure under load), an abort error handler in block 214 will be invoked for each of the sixty commands. A "test unit ready" command will be sent in block 218 for each abort error handler that succeeds at checkpoint 216. Before any failed command is processed in a subsequent error handler (such as a device reset error handler in block 220), all sixty of the failed commands will have been first processed within an abort error handler. In this way, each stage of the error recovery process is invoked for all failed commands, before proceeding on to the next stage of recovery.

In another embodiment, a computer-readable medium having computer-executable instructions stored thereon performs the methods of the embodiments described above. In one embodiment, the computer-readable medium includes a storage device (e.g., a floppy or hard-disk storage device) that contains a software driver executable on a host computer. In another embodiment, the computer-readable medium includes a firmware (or microcode) driver implemented on a host system. In another embodiment, the computer-readable medium includes a computer data signal embodied in a carrier wave that represents a sequence of computer-executable instructions. In yet another embodiment, the computer-readable medium includes a propagated signal carrying computer-readable information representing a computer program. In certain embodiments, a computer data signal is propagated over a network connection, such as an IP network connection.

Figure 3:
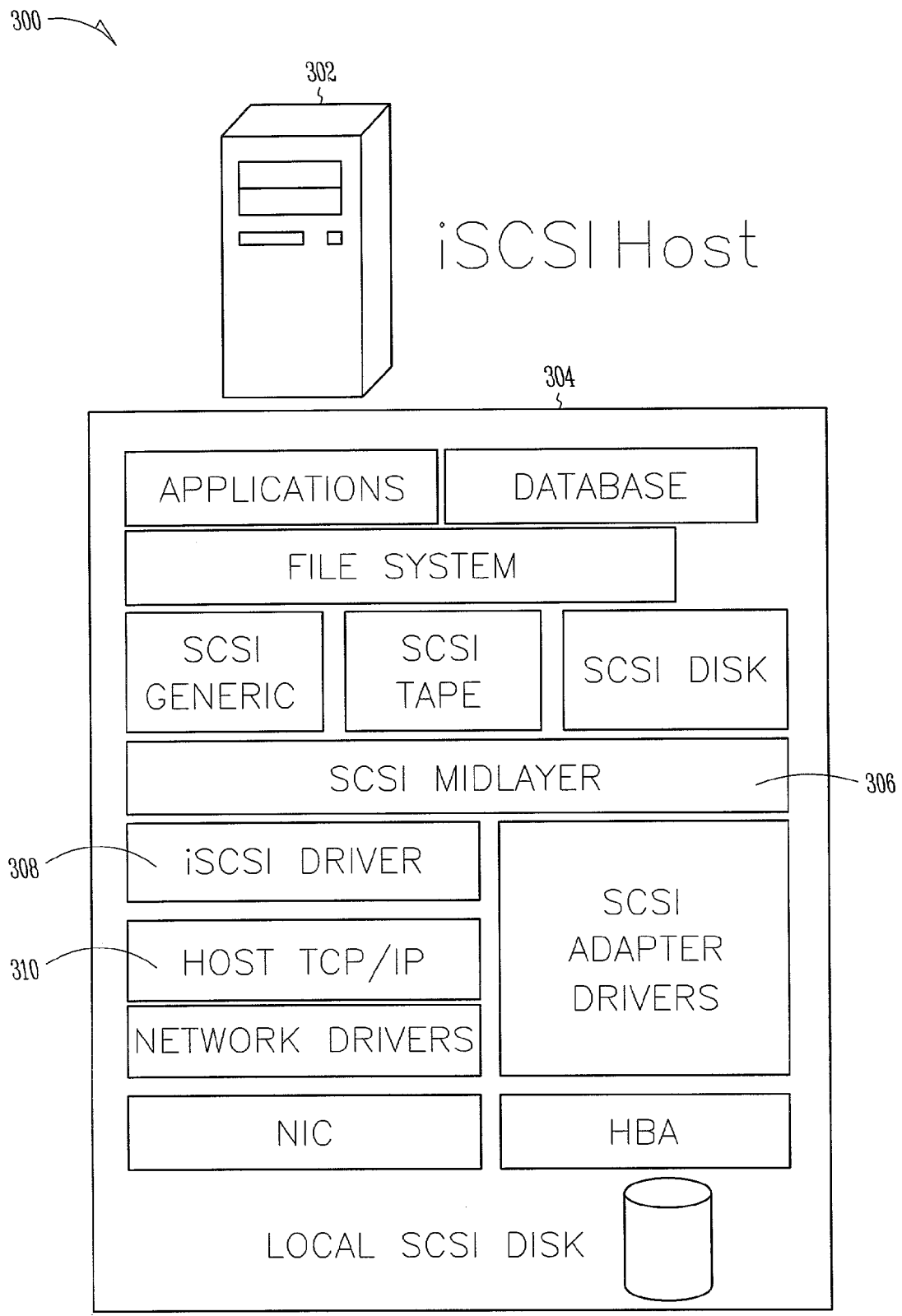
FIG. 3 is a block diagram illustrating a data-processing system that implements various embodiments of the present invention.

FIG. 3 is a block diagram illustrating a data-processing system that implements various embodiments of the present invention. One embodiment of applications on system 300 exists on a Linux operating system. System 300 includes iSCSI host server 302. Server 302 includes unit 304, which includes iSCSI driver 308, host TCP/IP layer 310, and SCSI midlayer application 306. In one implementation, iSCSI driver 308 is the Cisco Storage Networking iSCSI driver. In system 300, iSCSI driver 308 is inserted between the SCSI midlayer application 306 and the transport layer 310. Using the iSCSI protocol, iSCSI driver 308 allows server 302 to generate SCSI requests and responses and transport them over an Internet network. From the perspective of a server's operating system, iSCSI driver 308 appears to be a SCSI or Fibre Channel driver for a peripheral channel in server 302. In this embodiment, iSCSI driver 308 includes performs functionality for delayed error handling. In certain embodiments, iSCSI driver 308 includes functionality for the various error handler routines.

In another embodiment, system 300 comprises a data-processing system. In this embodiment, the data-processing system includes a processor, a memory, and data-processing software. The data-processing software is operable on the data-processing system to transmit a SCSI request to a peripheral device through an IP connection, wait for a SCSI response from the peripheral device, detect an error condition in the IP connection, wait for a specified period of time that is consistent with the IP connection being re-established, and determine if the error condition in the IP connection has been corrected. In another embodiment, the data-processing software that is operable on the data-processing system to transmit a SCSI request includes software to transmit an iSCSI request to the peripheral device through an IP connection. In another embodiment, the data-processing software is additionally operable on the data-processing system to process the SCSI response from the peripheral device if the error condition in the IP connection has been corrected. In another embodiment, the data-processing software is additionally operable on the data-processing system to establish a new IP connection to the peripheral device if the error condition has not been corrected. In another embodiment, the data-processing system further comprises a Network Interface Card (NIC) to provide the IP connection to the peripheral device.

In another embodiment, system 300 comprises an error-handling apparatus. In this embodiment, the error-handling apparatus includes a processor, a memory, and error-handling software. The error-handling software is operable on the apparatus to detect a SCSI error on a network connection to a peripheral device, and invoke (upon detection) a first error handler that checks the network connection, waits for a first amount of time that is consistent with the network connection being re-established, and controls a first error-handling function. The error-handling software is also operable on the apparatus to determine at a first point in time if the SCSI error has been corrected. In one embodiment, the error-handling software is additionally operable on the apparatus to establish a new network connection to the peripheral device if the SCSI error has not been corrected, and send the SCSI command to the peripheral device over the new network connection. In another embodiment, the error-handling software is additionally operable on the apparatus to invoke a second error handler that checks the network connection, waits for a second amount of time that is consistent with the network connection being re-established, and controls a second error-handling function. In this embodiment, the error-handling software is also operable to determine at a second point in time if the SCSI error has been corrected.

Figure 4A:
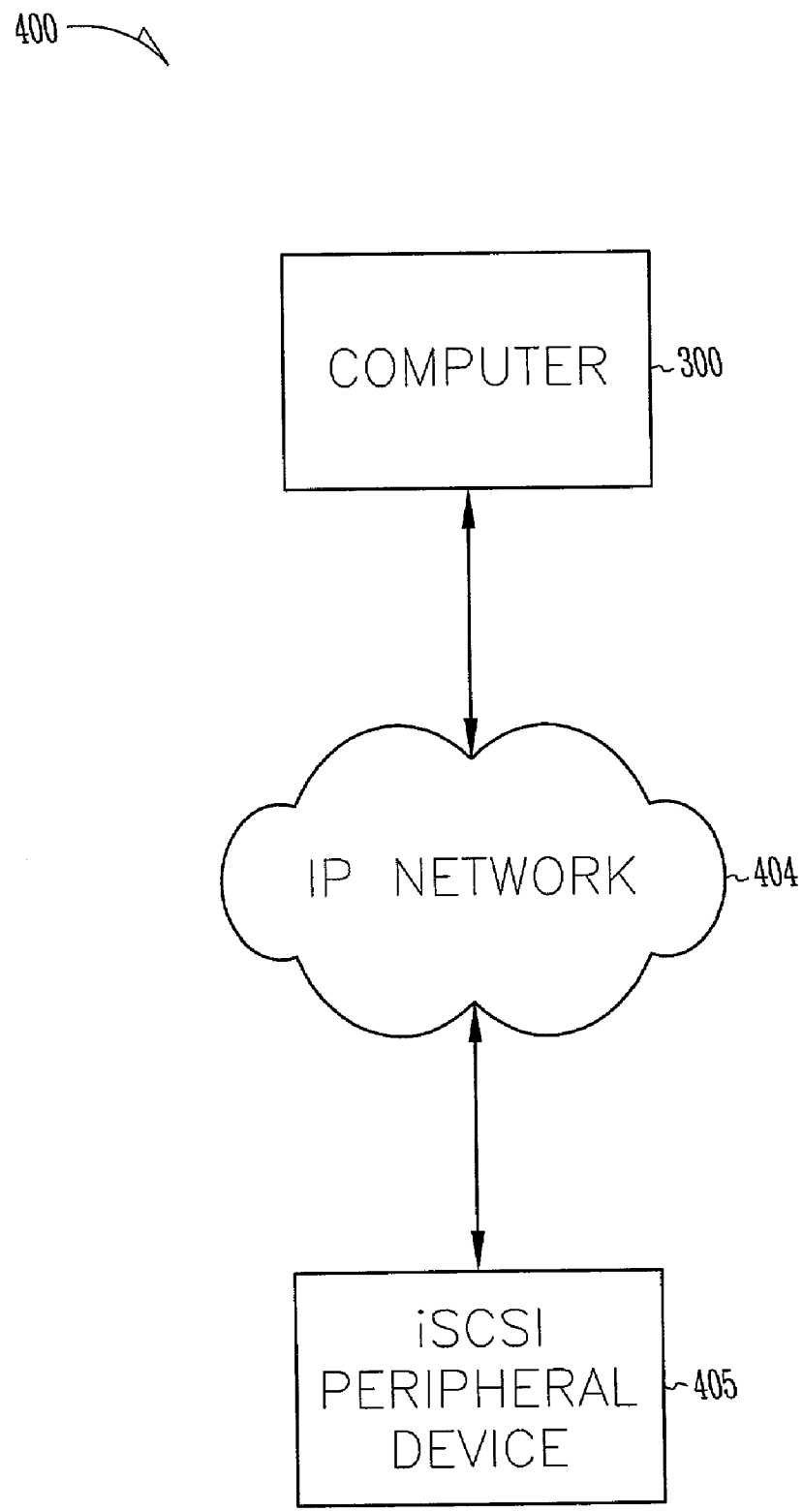
FIG. 4A is a block diagram illustrating a network-based storage system that implements various embodiments of the present invention.

FIG. 4A is a block diagram illustrating a network-based storage system that implements various embodiments of the present invention. In this embodiment, system 400 includes network 404 implementing an Internet Protocol (IP), computer 300 having a Network Interface Card (NIC) coupled to the network, wherein computer 300 includes error-handling code, and peripheral device 405 coupled to network 400. Computer 300 communicates with peripheral device 405 using iSCSI commands. The error-handling code includes code for waiting a predetermined amount of time after detecting that computer 300 cannot communicate with peripheral device 405 and before reissuing an iSCSI command. The predetermined amount of time is a function of a time required to re-establish network traffic with peripheral device 405. In one embodiment, peripheral device 405 includes a router coupled across a SCSI-based network to one or more SCSI devices.

Figure 4B:
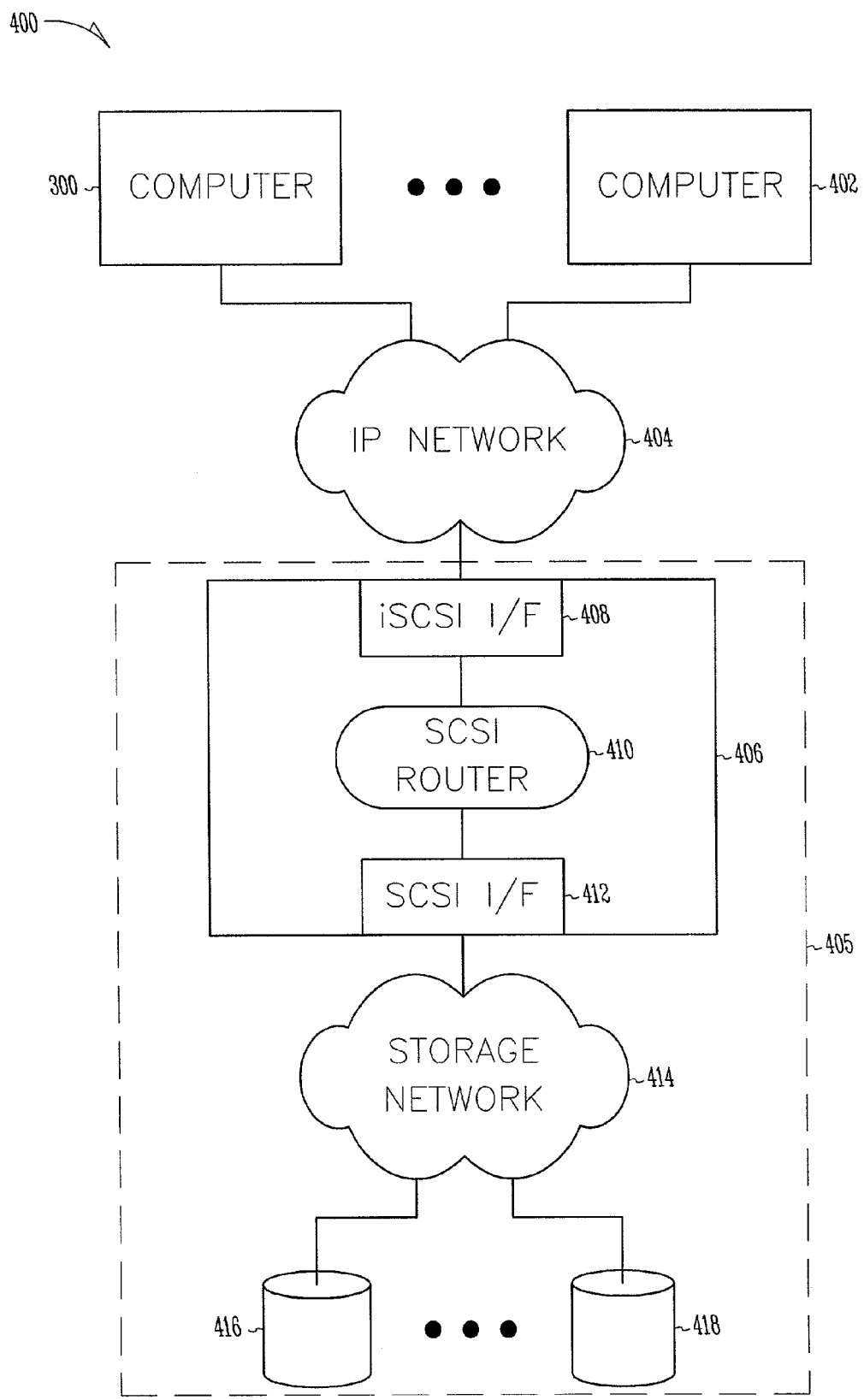
FIG. 4B is a block diagram illustrating an iSCSI-based storage system that implements various embodiments of the present invention.

FIG. 4B is a block diagram illustrating an iSCSI-based storage system that implements various embodiments of the present invention. System 400 includes computer servers (300, 402) connected through an IP network 404 to peripheral device 405. In this embodiment, peripheral device 405 includes routing device 406, storage network 414, and one or more SCSI devices (such as SCSI devices 416 and 418). Routing device 406 is connected through storage network 414 to the SCSI devices. In this embodiment, routing device 406 includes an iSCSI interface 408, a SCSI peripheral device 410 and a SCSI interface 412. iSCSI interface 408 receives encapsulated SCSI packets from IP network 404, extracts the SCSI packets, and sends the SCSI packets to SCSI peripheral device 410. SCSI interface 412 modifies the SCSI packets to conform with its network protocol (e.g., Fibre Channel, parallel SCSI, or iSCSI) and places the modified SCSI packets onto storage network 414. The SCSI packets are then delivered to their designated SCSI device (e.g., 416 or 418). In this embodiment, server 300 provides functionality for error handling, and is capable of detecting and handling errors in one or more sessions (or connections) via IP network 404 to routing device 406.

Figure 4C:
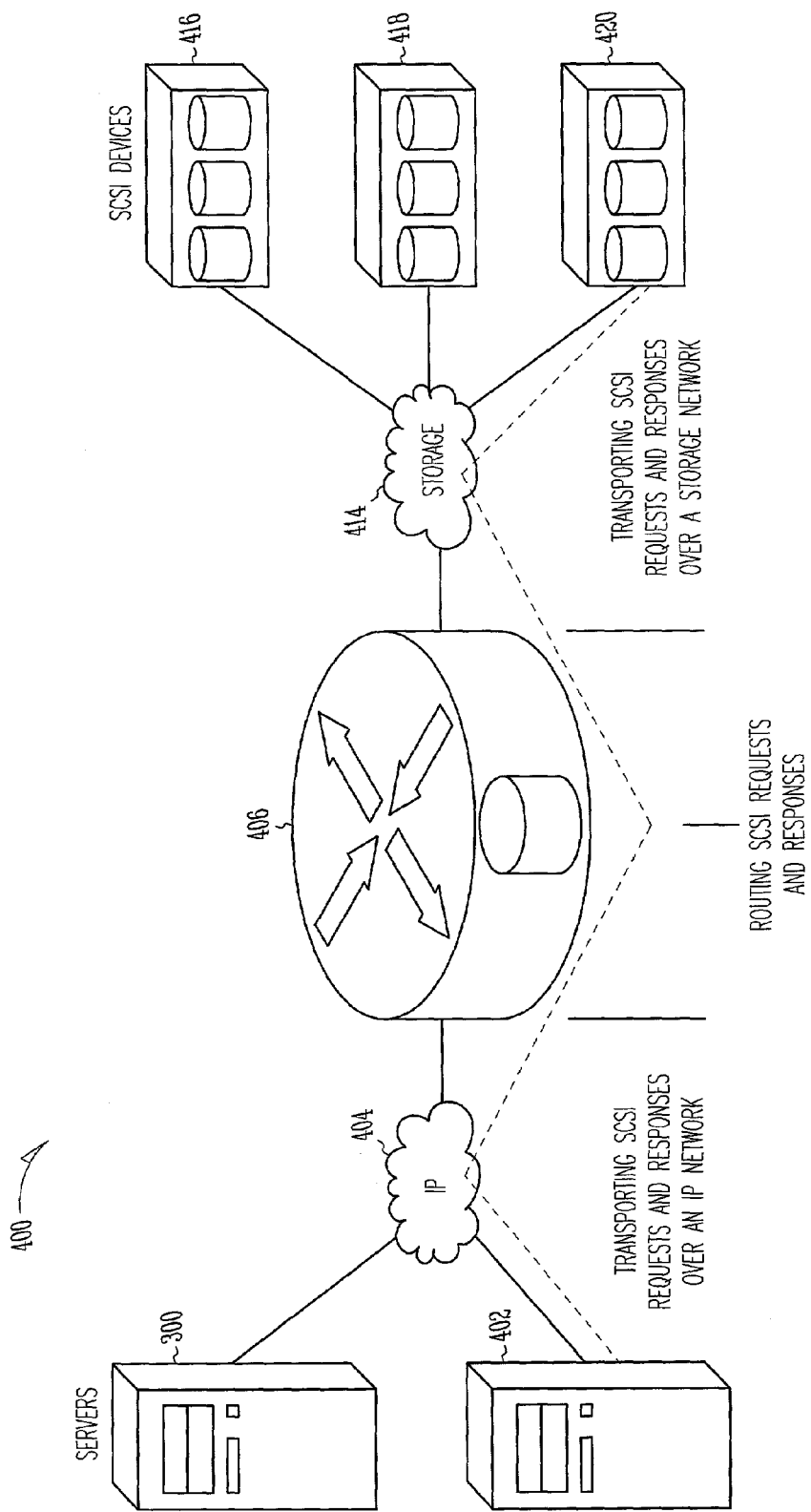
FIG. 4C is a block diagram illustrating a iSCSI-based storage system that implements various embodiments of the present invention.

FIG. 4C is a block diagram illustrating a iSCSI-based storage system that implements various embodiments of the present invention. In this embodiment of system 400, one or more servers 300, 402 access a storage network 414 via an IP network 404. A server issues a SCSI request and encapsulates the SCSI request in one or more IP packets. The encapsulated SCSI request is routed across IP network 404 to a routing device 406, where the SCSI request is extracted from the one or more IP packets. The extracted SCSI request is then routed through storage network 414 to a storage device (e.g., 416, 418, or 420) A server such as server 300, therefore, can access a storage device as if it were directly attached to the storage device.

As is shown in FIG. 4C, in one embodiment, system 400 can be viewed as performing three distinct actions for each request. First, SCSI requests are transported over an IP network. Second, SCSI requests are routed through routing device 406 to storage network 414. Finally, the SCSI request is transported across storage network 414 to a SCSI device (e.g., 416, 418, or 420). Similarly, system 400 can be viewed as performing three distinct actions for each response. First, SCSI responses are transported from a SCSI device (such as 416, 418, or 420) across storage network 414 Second, SCSI responses are routed through routing device 406 to IP network 404. Finally, the SCSI response is transported across IP network 404 to one of the servers 300 or 402. In this embodiment of system 400, server 300 provides functionality for error handling, and is capable of detecting and handling errors in one or more sessions (or connections) via IP network 404 to routing device 406.

Figure 5:
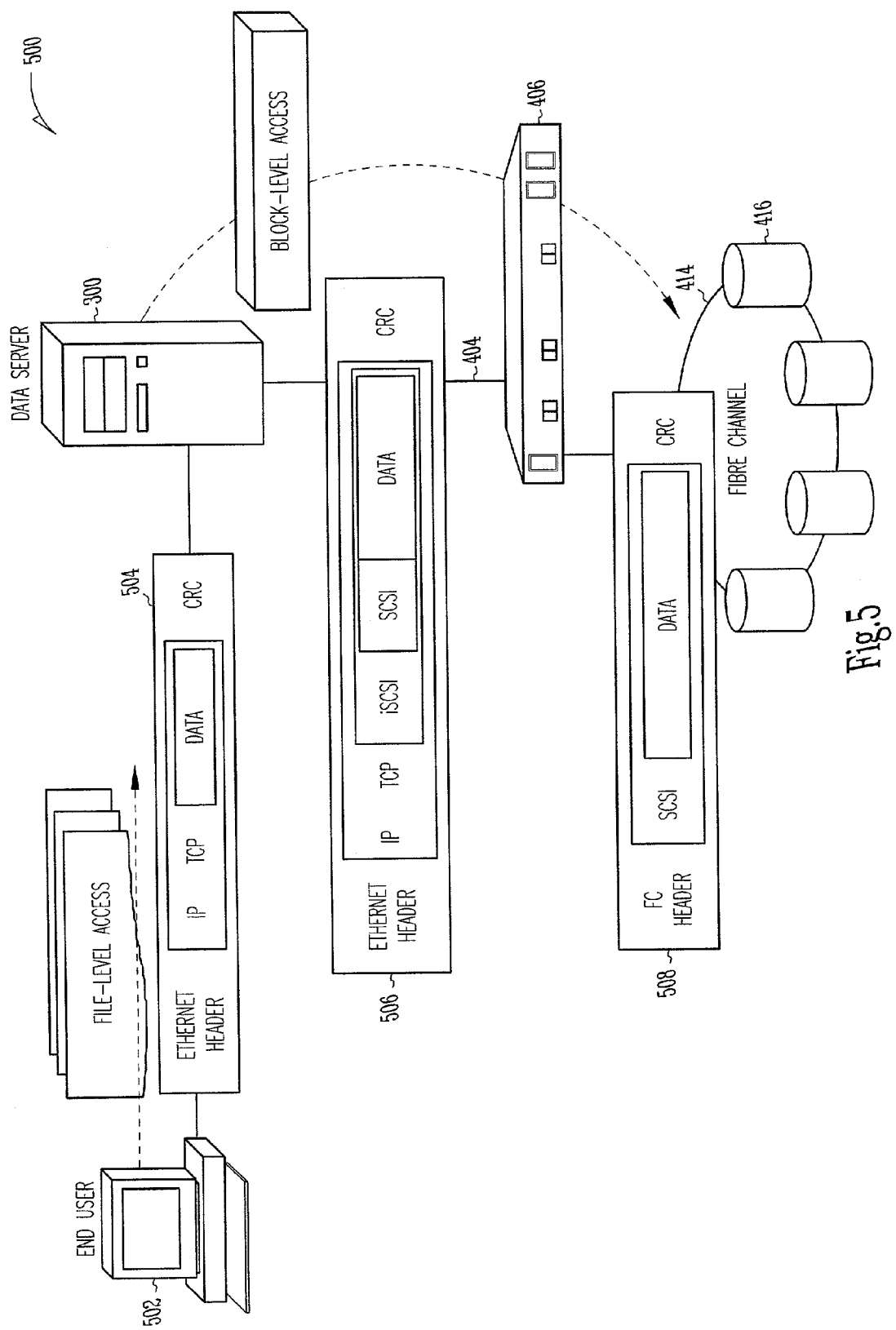
FIG. 5 is a block diagram illustrating iSCSI encapsulation in an error-handling system that implements various embodiments of the present invention.

FIG. 5 is a block diagram illustrating iSCSI encapsulation in an error-handling system that implements various embodiments of the present invention. In system 500, a driver in each server is used to encapsulate SCSI commands into one or more IP packets. The driver implements the iSCSI specification. An end user initiates a request for data from client 502. Client 502 sends the request via one or more IP packets 504 to server 300. Server 300 creates one or more SCSI block requests based on the file request received from client 502, encapsulates the SCSI block requests within IP packets 506, and sends the encapsulated packets 506 across IP network 404 to routing device 406 Routing device 406 extracts the SCSI block requests and sends the requests across storage network 414 to storage device 416. In the embodiment shown, storage network 414 is a Fibre-Channel (FC) network and the SCSI block requests are sent across storage network 414 as Fibre-Channel packets 508. Server 300 provides functionality for error handling, and is capable of detecting and handling errors in one or more sessions (or connections) via IP network 404 to routing device 406.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the described embodiments of the present invention.

What is claimed is:

1. A computerized method for handling an iSCSI error, the computerized method comprising:
   detecting the iSCSI error on an IP network connection to an iSCSI peripheral device after an iSCSI command has timed out;
   upon detection, waiting for an amount of time for the IP network connection to become re-established;
   while waiting, checking to determine if the IP network connection has been re-established, and if so aborting the waiting; and
   performing an iSCSI error-recovery function if the IP network connection has been re-established.

2. The computerized method of claim 1, wherein the performing of the iSCSI error-recovery function includes aborting the iSCSI command.

3. The computerized method of claim 1, wherein the performing of the iSCSI error-recovery function includes initiating a reset for a local bus or HBA.

* * * * *